April 28, 1953  B. H. CANADY ET AL  2,636,783
DUAL WHEEL MOUNTING
Filed Aug. 15, 1950  2 SHEETS—SHEET 1
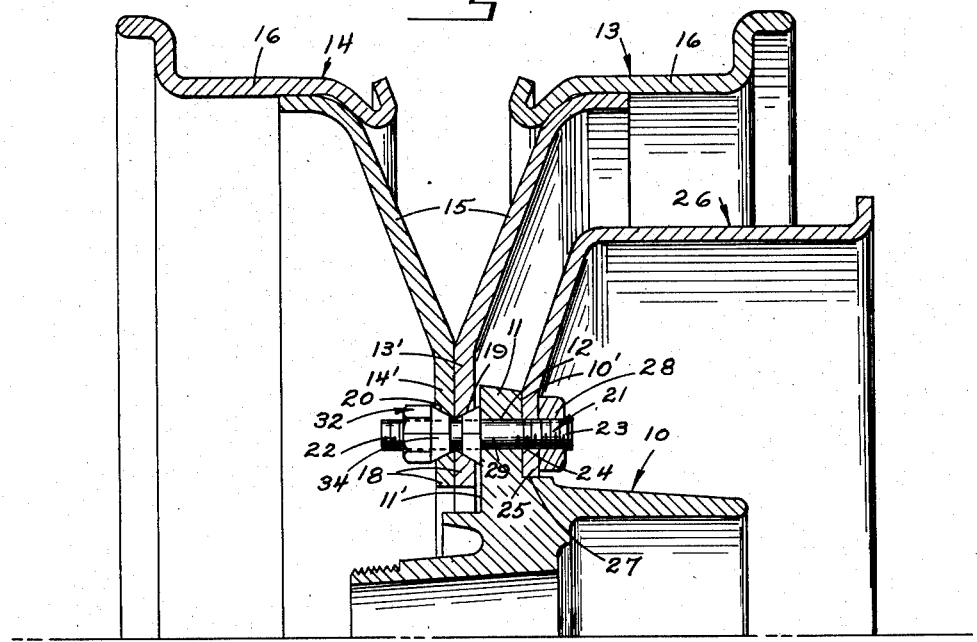
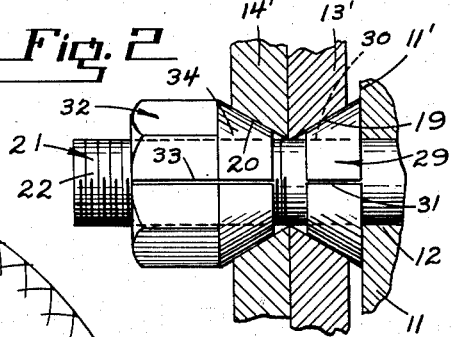
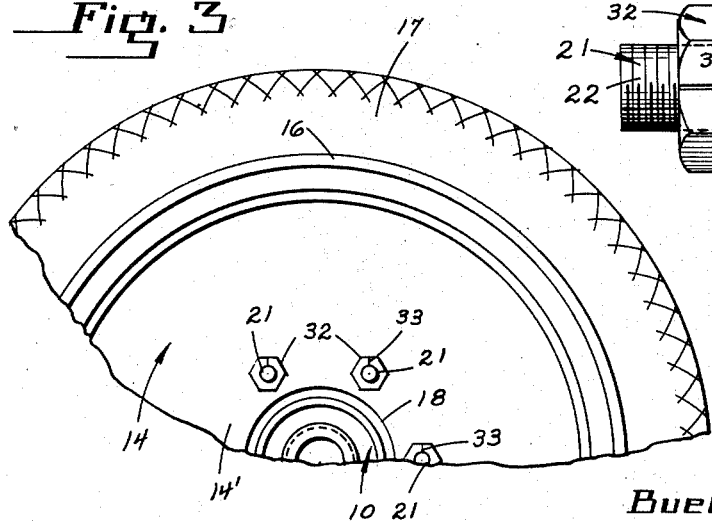
INVENTOR
Buel H. Canady
Clifford J. Wiley
BY
ATTORNEY

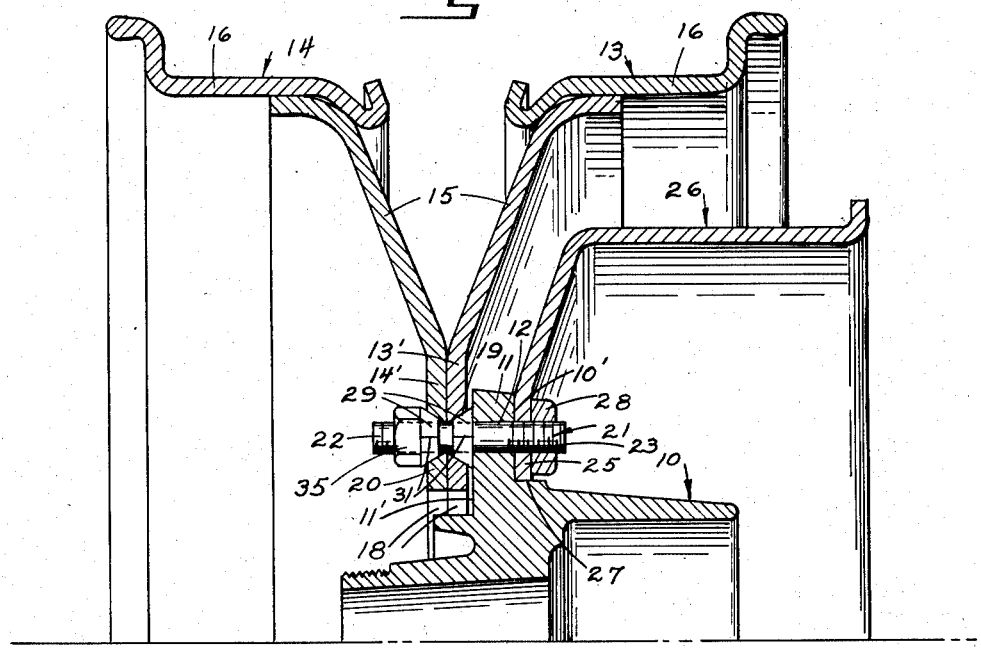
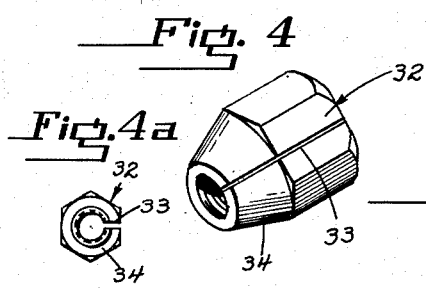
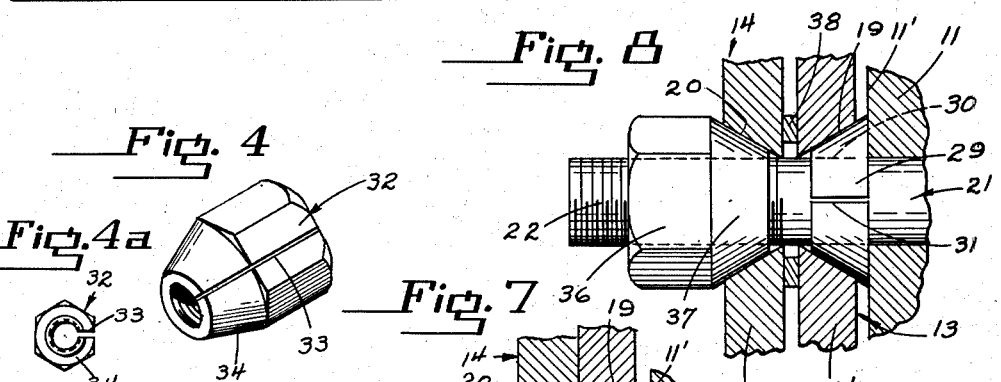
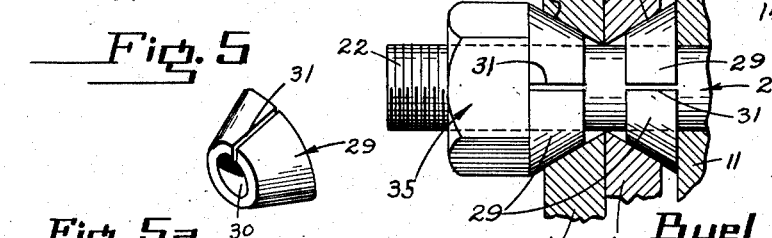
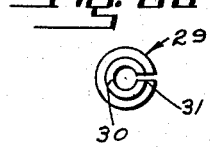

Patented Apr. 28, 1953

2,636,783

UNITED STATES PATENT OFFICE 2,636,783

DUAL WHEEL MOUNTING

Buel H. Canady, Huntington Park, Calif., and Clifford J. Wiley, Winslow, Ariz.

Application August 15, 1950, Serial No. 179,624

2 Claims. (Cl. 301—6)

Our invention relates to dual wheel mountings.

A primary object of the invention is to provide a dual wheel assembly which will maintain the disc wheels in tight engagement with the wheel hub at all times, and without liability of either disc wheel becoming loose during operation.

A further object of the invention is to provide novel and simplified disc wheel holding and locking means which enables the disc wheels of a dual wheel assembly to be readily mounted upon the wheel studs and tightly secured in place in a minimum time and with little effort.

A further object is to provide a dual wheel mounting which facilitates reworking and salvaging old disc wheels which have oversize or deformed stud openings, thereby affording a great saving of valuable material.

A further object is to provide a dual wheel mounting for aluminum disc wheels, and embodying novel means to support and lock the aluminum disc wheels in place in assembly, without cutting or otherwise mutilating them.

A further object is to provide a dual wheel mounting which is extremely strong and durable, and constructed so that the disc wheels will not freeze or bind upon the hub or wheel studs.

A further object is to provide a dual wheel assembly for heavy trucks, busses and the like, wherein both disc wheels and the brake drum are secured to the wheel hub by studs which carry the full load of the vehicle and which coact with novel wheel positioning and locking means to maintain the assembly tight during use.

A still further object of the invention is to provide a dual wheel assembly which is cheaper to make and easier to assemble, disassemble and inspect than conventional dual wheel assemblies.

Other objects and advantages of the invention will be apparent during the course of the following description.

This application shows a construction which is specifically different from the dual wheel mounting shown in our co-pending application S. N. 176,173, filed July 27, 1950, and the claims in the instant application 179,624 are all specific to the construction shown in said application 179,624.

In the accompanying drawings, forming a part of this application, and in which like numerals are employed to designate like parts throughout the same, Figure 1 is a radial cross section through a dual wheel mounting embodying our invention, Figure 2 is an enlarged fragmentary radial section through one wheel attaching stud and associated elements, Figure 3 is a fragmentary side elevational view of the wheel mounting drawn on a reduced scale, Figure 4 is a perspective view of a tapered lock nut, Figure 4a is an end elevation of the same, Figure 5 is a perspective view of a tapered adaptor or washer, Figure 5a is an end elevation of the same, Figure 6 is a radial cross section through a dual wheel assembly embodying a modified form of our invention, Figure 7 is an enlarged fragmentary radial section through one wheel attaching stud in the form of the invention shown by Figure 6, and, Figure 8 is a similar section through a dual wheel assembly embodying a further modification of the invention.

In the drawings, where for the purpose of illustration are shown preferred embodiments of our invention, attention is directed first to Figures 1 to 5a inclusive, wherein the numeral 10 designates a wheel hub which is mounted upon the vehicle axle, not shown, in a conventional manner. The hub 10 includes an annular radial spoke flange or plate 11, integral therewith, and having inner and outer flat faces or ends 10' and 11'. The spoke flange 11 is provided near and inwardly of its periphery with a plurality of circumferentially equidistantly spaced axial cylindrical openings 12, arranged radially outwardly of the body portion of the hub 10, as shown.

The numerals 13 and 14 designate inner and outer disc wheels, comprising annular flat inner disc portions 13' and 14', which extend radially, and outer generally radial diverging portions 15, upon the circumferences of which are mounted rims 16, rigidly secured thereto by welding or the like. The rims 16 are of conventional construction, and adapted to carry pneumatic tires 17, Figure 3. The flat disc portions 13' and 14' have large central axial openings 18 which register in assembly and permit the disc wheels to pass over the outer end of the hub 10. The disc portions 13' and 14' are further provided radially outwardly of the openings 18 with inner and outer conical openings 19 and 20. The inner and outer conical openings 19 and 20 are arranged in circumferentially equidistantly spaced groups which are adapted to register with each other and with the group of openings 12 of the hub flange 11. The inner conical openings 19 taper axially outwardly, and the outer conical openings 20 taper axially inwardly. The openings 19 and 20 extend entirely through the respective disc portions 13' and 14'. The inner and outer conical openings 19 and 20 preferably have the same degree of taper, and also preferably have equal diameters so that the small ends of the conical openings at the meeting faces of the discs 13' and 14' register. We prefer that the conical openings 19 and 20 have included angles of approximately 60 degrees, but we do not wish to restrict our invention to this precise degree of taper, and the degree of taper of the conical openings may of course be varied. It is also preferred that the diameters of the conical openings 19 and 20 at their opposed small ends be substantially equal to the diameters of the openings 12.

Axial bolts or studs 21 are provided, and screw-threaded at their opposite ends, as shown at 22 and 23. The inner screw-threaded ends 23 of the studs project through openings 24 in the outer flat radial web or disc 25 of a wheel brake drum 26. The radial web 24 engages the inner face 10' of the spoke flange 11, and is provided with a central axial opening 27, receiving the inner end of the hub 10. The inner screw-threaded ends 23 project axially inwardly of the web 25 and are provided with nuts 28 which are tightened against the inner face of the web 25. The openings 24 register with the openings 12 of the hub, and the studs 21 extend through the openings 12, 19 and 20. The outer screw-threaded ends 22 project a substantial distance outwardly of the disc portion 14', as shown.

Split conical adaptors or washers 29 are provided, and these adaptors have cylindrical bores 30 which receive the studs 21. The peripheries of the adaptors 29 are tapered axially and have the same degree of taper as the conical openings 19 in which they engage. The adaptors 29 are split radially, as shown at 31, and the splits extend from the bores 30 through the conical peripheries of the adaptors. In assembly, the adaptors 29 are arranged near the longitudinal centers of the studs 21 and have their smaller ends arranged outermost. The inner ends of the conical adaptors 29 engage the outer face 11', and the inner ends of the tapered adaptors extend axially inwardly beyond the inner face of the disc 13'. The outer or smaller ends of the adaptors 29 terminate axially inwardly of the meeting faces of the discs 13' and 14'. With this arrangement, the inner disc 13' is maintained spaced axially outwardly a slight distance from the outer face 11'. This prevents any possible freezing or binding between the inner disc wheel 13 and spoke flange 11. When the wheel assembly is tightened, in a manner to be fully described, the split adaptors 29 are drawn into the tapered openings 19 and contracted. The cylindrical bores 30 then tightly engage the studs 21, and the adaptors become securely locked in place upon the studs, and at the same time are wedged tightly into the tapered openings 19. When the adaptors 29 are first applied to the studs 21, and before they are forced into the tapered openings 19, their bores 30 have a sliding fit over the studs 21.

The outer screw-threaded ends 22 extend outwardly of the disc 14, as previously stated, and split locking nuts 32 are mounted upon the screw-threaded ends 22 in opposition to the nuts 28. The locking nuts 32 are split radially from their screw-threaded bores entirely through their side walls, as shown at 33, and the inner ends of the locking nuts 32 are conically tapered as at 34 for engagement within the tapered openings 20. The degree of taper of the nuts 32 is preferably the same as that of the openings 20. The inner ends of the locking nuts 32 terminate axially outwardly of the meeting faces of the discs 13' and 14', so that inner ends of the nuts are spaced from the outer opposed ends of the split washers 29, even when the locking nuts 32 are tightened to the fullest possible extent. When the locking nuts 32 are tightened, their conically tapered extensions 34 are wedged into the tapered openings 20, and the split nuts are contracted so that their screw-threaded bores clamp tightly about the studs 21. Before the locking nuts 32 are tightened, they have normal screw-threaded engagement with the studs 21, like conventional nuts which are not split. It is only after the nuts 32 contract due to the wedging of their tapered portions 34 in the openings 20 that the nuts have locking or clamping engagement with the studs. When the nuts are tightened, the flat discs 13' and 14' are drawn into tight contact, and are in engagement over their entire areas. Since the discs 13' and 14' are flat, and since there is always a space between the opposed ends of the nuts 32 and adaptors 29, there is no liability of the disc wheels 13 and 14 freezing or binding together in assembly. There is likewise no liability of the disc wheels binding or freezing upon the studs 21, since the disc wheels do not engage the studs directly, but are connected therewith through the medium of the tapered adaptors 29 and tapered locking nuts 32. When the locking nuts 32 are tightened, they wedge tightly into the openings 20 as previously stated, and cause the adaptors 29 to wedge tightly into the tapered openings 19. There is now no liability of the dual wheel assembly loosening during use, since both the tapered adaptors 29 and locking nuts 32 have contracted circumferentially, and have a substantial binding or locking engagement with the studs 21, due to their split constructions.

With our arrangement described above, the disc wheels 13 and 14 may be applied and removed from the outer side of the wheel, it being unnecessary to work from the inner or brake drum side. Since the openings 19 and 20 taper in opposite directions, once the locking nuts 32 have been removed, both disc wheels are removable from the outer side of the vehicle wheel. Also, our dual wheel assembly may be readily inspected, and tightened from the outer side of the wheel. The entire load of the vehicle is transmitted to the studs 21, and the brake drum 26 carries no part of the load. The conical openings 19 and 20 afford generous bearing areas to absorb the load transmitted through the studs to the discs 13' and 14'. The entire construction is extremely sturdy and durable and all parts are easy to machine so that the wheel assembly is relatively inexpensive to make.

Attention is directed next to Figures 6 and 7, wherein a modification of the invention is illustrated. In this form of the invention, the connecting means between the disc wheels 13 and 14 and the hub 10 are particularly adapted for use with aluminum disc wheels, where it is highly desirable not to cut or otherwise deface the flat radial webs 13' and 14' or the conically tapered openings 19 and 20. In Figures 6 and 7, we do not employ the split and tapered locking nuts 32, described in the first form of the invention. Instead, an additional split tapered adaptor 29 is applied to the outer end of each stud 21 and engages within the outer tapered opening 20. A plain locking nut 35 is then applied to the outer end of each stud 21, and this nut engages the outer flat face of the outermost adaptor 29 and forces the adaptor into the tapered opening 20. The two adaptors 29 will contract and clamp tightly upon the stud 21 when the locking nut 35 is tightened. The advantage of this arrangement with aluminum disc wheels 13 and 14 resides in the fact that neither of the tapered adaptors 29 will rotate to any appreciable extent when the plain locking nut 35 is drawn up tightly. If the split locking nuts 32 were used, the tapered portion 34 would rotate within the opening 28 and tend to cut and deform the same when the discs 13' and 14' are formed of aluminum. The inner opposed ends of the two tapered adaptors 29, Figure 7, are always spaced apart axially, and there is no liability of the parts binding together in assembly. All other parts illustrated in Figures 6 and 7 are identical with those corresponding parts shown and described in connection with the first form of the invention.

In Figure 8, we have shown a further slight modification of the invention, wherein locking nuts 36 having conically tapered inner ends 37 are applied to the outer screw-threaded ends 22 of the studs 21. These locking nuts 36 are identical with the locking nuts 32, except that they are not split. In order to obtain a locking effect similar to that obtained by the use of the split locking nuts 32, we employ conventional split type spring lock washers 38 which are mounted upon the studs 21, between the wheel discs 13' and 14'. These lock washers 38 are compressed between the discs 13' and 14' when the solid locking nuts 36 are tightened, and the discs 13' and 14' are spaced apart slightly in assembly, as shown. The tapered adaptor 29 clamps tightly about the stud 21, as previously described, and the spring action of the lock washer 38 tends to separate or push apart the discs 13' and 14'. This spreading action of the lock washers 38 tends to lock or bind the nuts 36 in their tightened positions. All other parts of the invention illustrated by Figure 8 are identical with corresponding parts shown and described in the prior forms of the invention.

An important advantage common to all forms of the invention resides in the fact that our arrangement permits the use of standard wheel studs now in use. Also, we may successfully employ used disc wheels having worn or oversized stud receiving holes. It is merely necessary to ream out or re-coin the oversized openings, and to provide the tapered adaptors 29 having the proper outside diameters to fit into the newly formed openings. This facilitates a great saving of material which would be lost if the worn disc wheels were discarded.

It is to be understood that the forms of our invention herewith shown and described are to be taken as preferred examples of the same, and that various changes in shape, size and arrangement of parts may be resorted to without departing from the spirit of our invention or the scope of the subjoined claims.

Having thus described our invention, we claim:

1. A dual wheel assembly comprising a hub having a spoke flange provided with a radial flat outer face and having circumferentially spaced openings extending axially of the flange, a wheel brake drum having a web arranged upon the inner side of the flange and provided with circumferentially spaced openings extending axially of the hub, bolts extending through the openings in the flange and web and corresponding in number to the openings for securing the web to the flange, said bolts extending outwardly beyond the flange, inner and outer disc wheels to be secured to the hub and including disc portions having main openings for receiving a portion of the hub and larger than such hub portion so that the disc portions are free from thermal contact with the hub at the main openings, the inner disc portion having circumferentially spaced openings tapered outwardly throughout their entire lengths and extending through the opposite faces of such inner disc portion and the outer disc portion having circumferentially spaced openings tapered outwardly throughout their entire lengths and extending through the opposite faces of the outer disc portion, the tapered openings extending axially of the hub and being in alignment with each other and the openings in the flange and corresponding in number to the flange openings and receiving the bolts which extend outwardly beyond the outer disc portion, an annular split adapter mounted upon each bolt, said adapter being tapered outwardly throughout its entire length to fit within each tapered opening of the inner disc portion for clamping engagement with the bolt and rigidly mounting the inner disc portion upon the bolt and being of a length to engage the major portion of the wall of the tapered opening of the inner disc portion and to extend inwardly beyond the inner disc portion for a substantial distance and having a radial flat inner end face to contact with the outer flat face of the flange and retain the inner disc portion spaced from and out of thermal contact with the flange, a second annular split adapter mounted upon the outer end of each bolt and tapered inwardly throughout its entire length to fit within each tapered opening of the outer disc portion, the last-named adapter being of a length to engage the major portion of the wall of the tapered opening of the outer disc portion and serving to rigidly mount the outer disc portion upon the bolt, the outer disc portion bearing against the inner disc portion, and a split nut formed integral with the outer annular adapter and mounted upon the outer end of each bolt, the reduced ends of the tapered adapters being spaced.

2. A dual wheel assembly comprising a hub having a spoke flange provided with a radially flat outer face and having circumferentially spaced openings extending axially of the flange, a wheel brake drum having a web arranged upon the inner side of the flange and provided with circumferentially spaced openings extending axially of the hub, bolts extending through the openings in the flange and web and corresponding in number to the openings for securing the web to the flange, said bolts extending outwardly beyond the flange, inner and outer disc wheels to be secured to the hub and including disc portions having main openings for receiving a portion of the hub and larger than such hub portion so that the disc portions are free from the thermal contact with the hub at the main openings, the inner disc portion having circumferentially spaced openings tapered outwardly throughout their entire lengths and passing through the opposite faces of such inner disc portion and the outer disc portion having circumferentially spaced openings tapered outwardly throughout their entire lengths and passing through the opposite faces of such outer disc portion, the tapered openings extending axially of the hub and being in axial alignment with each other and the openings in the flange and corresponding in number to the flange openings and receiving the bolts which extend outwardly beyond the outer disc portion, an annular adapter mounted upon each bolt, said adapter being tapered outwardly throughout its entire length to fit within each tapered opening of the inner disc portion and rigidly mounting the inner disc portion upon the bolt and being of a length to engage with the major portion of the wall of such tapered opening of the inner disc portion and to extend inwardly beyond the inner disc portion for a substantial distance and having a radially flat inner face to contact with the outer flat face of the flange and retain the inner disc portion spaced from and out of thermal contact with the flange, a second annular split adapter mounted upon each bolt adjacent to the outer disc portion and tapered inwardly throughout its entire length to fit within each tapered opening of the outer disc portion and being of a length to engage with the major portion of the tapered opening of the outer disc portion and to extend beyond the outer face of the outer disc portion, the last-named adapter serving to rigidly mount the outer disc portion upon the bolt, the inner ends of the tapered adapters being permanently spaced, and a nut separate from the outer adapter and engaging therewith and mounted upon the outer end of each bolt.

BUEL H. CANADY.
CLIFFORD J. WILEY.

References Cited in the file of this patent

UNITED STATES PATENTS

| Number | Name | Date |
|---|---|---|
| 1,635,895 | Michelin | July 12, 1927 |
| 1,850,397 | Hunt | Mar. 22, 1932 |
| 1,994,375 | Magenhorst | Mar. 12, 1935 |
| 2,336,767 | Ash | Dec. 14, 1943 |
| 2,522,707 | Ash | Dec. 12, 1950 |
| 2,545,130 | Ash | Mar. 13, 1951 |

FOREIGN PATENTS

| Number | Country | Date |
|---|---|---|
| 215,582 | Great Britain | May 15, 1924 |